United States Patent
Zieger

(10) Patent No.: US 11,964,552 B2
(45) Date of Patent: Apr. 23, 2024

(54) PRESSURE VESSEL AND VEHICLE

(71) Applicant: FTXT ENERGY TECHNOLOGY CO., LTD., Shanghai (CN)

(72) Inventor: Andreas Zieger, Shanghai (CN)

(73) Assignee: FTXT ENERGY TECHNOLOGY CO., LTD., Shanghai (CN)

( * ) Notice: Subject to any disclaimer, the term of this patent is extended or adjusted under 35 U.S.C. 154(b) by 167 days.

(21) Appl. No.: 17/704,039

(22) Filed: Mar. 25, 2022

(65) Prior Publication Data
US 2022/0274483 A1 Sep. 1, 2022

Related U.S. Application Data

(63) Continuation of application No. PCT/CN2020/116807, filed on Sep. 22, 2020.

(30) Foreign Application Priority Data

Sep. 26, 2019 (CN) .......................... 201910917542.8

(51) Int. Cl.
*B60K 15/03* (2006.01)
*F17C 1/00* (2006.01)

(52) U.S. Cl.
CPC .......... *B60K 15/03006* (2013.01); *F17C 1/00* (2013.01); *B60K 2015/03026* (2013.01);
(Continued)

(58) Field of Classification Search
CPC .... F17C 1/00; F17C 13/04; F17C 2205/0332; F17C 2205/0323; F17C 2205/0302;
(Continued)

(56) References Cited

U.S. PATENT DOCUMENTS

| 6,186,356 B1 | 2/2001 | Berkley et al. |
| 2011/0210516 A1 | 9/2011 | Sharp et al. |
| 2011/0284562 A1* | 11/2011 | Novak ....................... F17C 1/16 220/694 |

FOREIGN PATENT DOCUMENTS

| CN | 101133281 A | 2/2008 |
| CN | 101382235 A | 3/2009 |

(Continued)

OTHER PUBLICATIONS

Office Action in Russia Application No. 2022110994/12(023181), dated Oct. 25, 2023.
(Continued)

*Primary Examiner* — Robert J Hicks

(57) ABSTRACT

Provided are a pressure vessel and a vehicle. The pressure vessel includes a casing, a cylinder valve, a valve seat and an inner liner, the casing has a storage space, the casing has a communication channel communicating the storage space with an outside, the cylinder valve is disposed at the communication channel and configured to adjust an opening degree of the communication channel, the valve seat is at least partially supported between the cylinder valve, the inner liner is disposed on an inner wall surface of the casing, the cylinder valve extends out of the inner liner, the inner liner includes a fitting portion adapted to surround and be attached on an outer peripheral surface of the cylinder valve, and a limiting portion is provided on an inner wall surface of the valve seat and adapted to be attached on and stop the outer peripheral surface of the cylinder valve.

10 Claims, 4 Drawing Sheets

(52) U.S. Cl.
CPC ............... *B60K 2015/03059* (2013.01); *B60K 2015/03256* (2013.01); *F17C 2203/0604* (2013.01); *F17C 2260/042* (2013.01)

(58) Field of Classification Search
CPC ...... F17C 2205/0388; B60K 15/03006; B60K 2015/03026
USPC .......... 220/589, 588, 586, 581, 303, 203.19, 220/203.01, 202
See application file for complete search history.

(56) References Cited

FOREIGN PATENT DOCUMENTS

| | | |
|---|---|---|
| CN | 102392894 A | 3/2012 |
| CN | 102695906 A | 9/2012 |
| CN | 103814248 A | 5/2014 |
| CN | 205026370 U | 2/2016 |
| CN | 106439488 A | 2/2017 |
| CN | 109751509 A | 5/2019 |
| CN | 210687763 U | 6/2020 |
| DE | 102011010685 A1 | 8/2011 |
| DE | 202016006546 U1 | 8/2017 |
| EP | 2115343 B1 | 11/2010 |
| JP | 2007263290 A | 10/2007 |
| RU | 2151336 C1 | 6/2000 |
| RU | 100809 U1 | 12/2010 |
| WO | WO-2013000956 A1 * 1/2013 ............... F17C 1/06 |
| WO | 2013020694 A1 | 2/2013 |
| WO | 2013080810 A1 | 6/2013 |
| WO | 2018060465 A1 | 4/2018 |

OTHER PUBLICATIONS

Informatorium [online], URL: https://www.gazprominfo.ru/articles/gas-fuel/, published Apr. 20, 2016.
The extended European search report in European Patent Application No. 20868238.5, dated Sep. 29, 2023.

* cited by examiner

PRESSURE VESSEL AND VEHICLE

CROSS-REFERENCE TO RELATED APPLICATIONS

This application is a continuation of International Patent Application NO. PCT/CN2020/116807, filed on Sep. 22, 2020, which claims priority to Chinese Application No. 201910917542.8, entitled "Pressure Vessel and Vehicle" and filed on Sep. 26, 2019, the entire disclosures of which are incorporated herein by their references.

FIELD

The present disclosure relates to the field of pressure device manufacturing, and more particularly, to a pressure vessel and a vehicle.

BACKGROUND

In the related art, a pressure vessel can have various applications, for example, the pressure vessel can be used in new energy vehicles such as fuel cell vehicles or natural gas vehicles, and used as a fuel storage apparatus for the vehicles. If the fuel gas in the pressure vessel leaks, there is a risk of explosion, and therefore, the pressure vessel needs to have a reliable sealing performance.

In an existing pressure vessel A0, e.g., in patent CN101548128B, as shown in FIG. 4, a valve seat A1 is sleeved and sealed outside a cylinder valve A2, and an inner liner A3 is sleeved and sealed outside the valve seat A1. In order to ensure the sealing performance of the vessel, in this solution, it is necessary to provide a first sealing ring A5 between the valve seat A1 and the cylinder valve A2 to ensure the sealing performance between the valve seat A1 and the cylinder valve A2, and provide a second sealing ring A6 between the inner liner A3 and the valve seat A1 to ensure the sealing performance between the inner liner A3 and the valve seat A1. Since it is necessary to ensure the sealing at the two positions to achieve the sealing between the cylinder valve A2 and a communication channel A4, when the sealing of either the first sealing ring A5 or the second sealing ring A6 fails, the overall sealing of the pressure vessel A0 will fail, and this solution has poor sealing reliability.

SUMMARY

In view of this, a first objective of the present disclosure is to provide a pressure vessel capable of improving the sealing reliability between the cylinder valve and the communication channel at least to a certain extent.

In order to achieve the above-mentioned objective, the technical solutions of the present disclosure are achieved as follows.

A pressure vessel includes a casing, a cylinder valve, a valve seat, and an inner liner. The casing has a storage space defined therein, and the casing has a communication channel that communicates the storage space with an outside. The cylinder valve is disposed at the communication channel and configured to adjust an opening degree of the communication channel. The inner liner is disposed on an inner wall surface of the casing facing towards the storage space. An inner liner connecting portion is formed between the inner liner and the casing. The cylinder valve extends out of the inner liner. The inner liner includes a fitting portion adapted to surround and be attached on an outer peripheral surface of the cylinder valve. The valve seat is at least partially supported between the cylinder valve and the communication channel. A limiting portion is provided on an inner wall surface of the valve seat, and the limiting portion is adapted to be attached on and stop the outer peripheral surface of the cylinder valve.

Further, the valve seat includes: a first support portion and a second support portion. The first support portion is located in the communication channel and positioned and sandwiched between the communication channel and the cylinder valve. The second support portion is connected to the first support portion and located in the storage space and in the inner connecting portion, and abuts against the inner wall surface of the casing.

Further, a depth of the cylinder valve extending into the storage space along the communication channel does not exceed a depth of the valve seat extending into the storage space along the communication channel. The inner liner includes a curved portion that protrudes towards the storage space. An inner side of the curved portion forms the inner liner connecting portion. The curved portion has a via opening through which the cylinder valve extends. A circumferential edge of the via opening surrounds the fitting portion. The fitting portion is located in the inner liner connecting portion and sandwiched between the cylinder valve and the valve seat.

Further, a depth of the cylinder valve extending into the storage space along the communication channel exceeds a depth of the valve seat extending into the storage space along the communication channel. The inner liner has a curved portion that protrudes towards the storage space. An inner side of the curved portion forms the inner liner connecting portion. The curved portion has a via opening through which the cylinder valve extends. A circumferential edge of the via opening surrounds the fitting portion. The fitting portion is adapted to be attached on a portion of the cylinder valve extending out of the inner liner connecting portion.

Further, an annular sealing groove is defined on a free end of the fitting portion, and a first sealing member for sealing the cylinder valve and the fitting portion is sleeved in the annular sealing groove.

Further, a backup sealing member for sealing the cylinder valve and the fitting portion is further sleeved in the annular sealing groove.

Further, the valve seat is fixedly attached on the curved portion.

Compared with the related art, the pressure vessel described in the present disclosure has the following advantages:

1) According to the pressure vessel of the present disclosure, by provision of the inner liner connecting portion, sealing between the cylinder valve and the communication channel can be achieved only by ensuring the sealing between the inner liner and the cylinder valve. In this way, the difficulty of sealing is reduced, the manufacturing cost is reduced, and strong sealing reliability between the cylinder valve and the communication channel is provided. By the provision of the limiting portion on an inner wall surface of the valve seat, the limiting portion being adapted to be attached on and stop the outer peripheral surface of the cylinder valve, the stable support of the valve seat to the cylinder valve can be ensured.

The second objective of the present disclosure is to provide a vehicle including any one of the above-mentioned pressure vessels.

Compared with the related art, the vehicle described in the present disclosure has the following advantages:

1) According to the vehicle of the present disclosure, by the provision of the pressure vessel, the fuel in the pressure vessel is not likely to leak, burning or explosion due to the fuel leakage of the vehicle is avoided, and the vehicle can work reliably.

BRIEF DESCRIPTION OF DRAWINGS

The accompanying drawings constituting a part of the present disclosure are used to provide further understanding of the present disclosure, and the schematic embodiments and descriptions of the schematic embodiments are used to explain the present disclosure and do not constitute an improper limitation on the present disclosure.

DESCRIPTION OF REFERENCE NUMBERS

Figure 1:
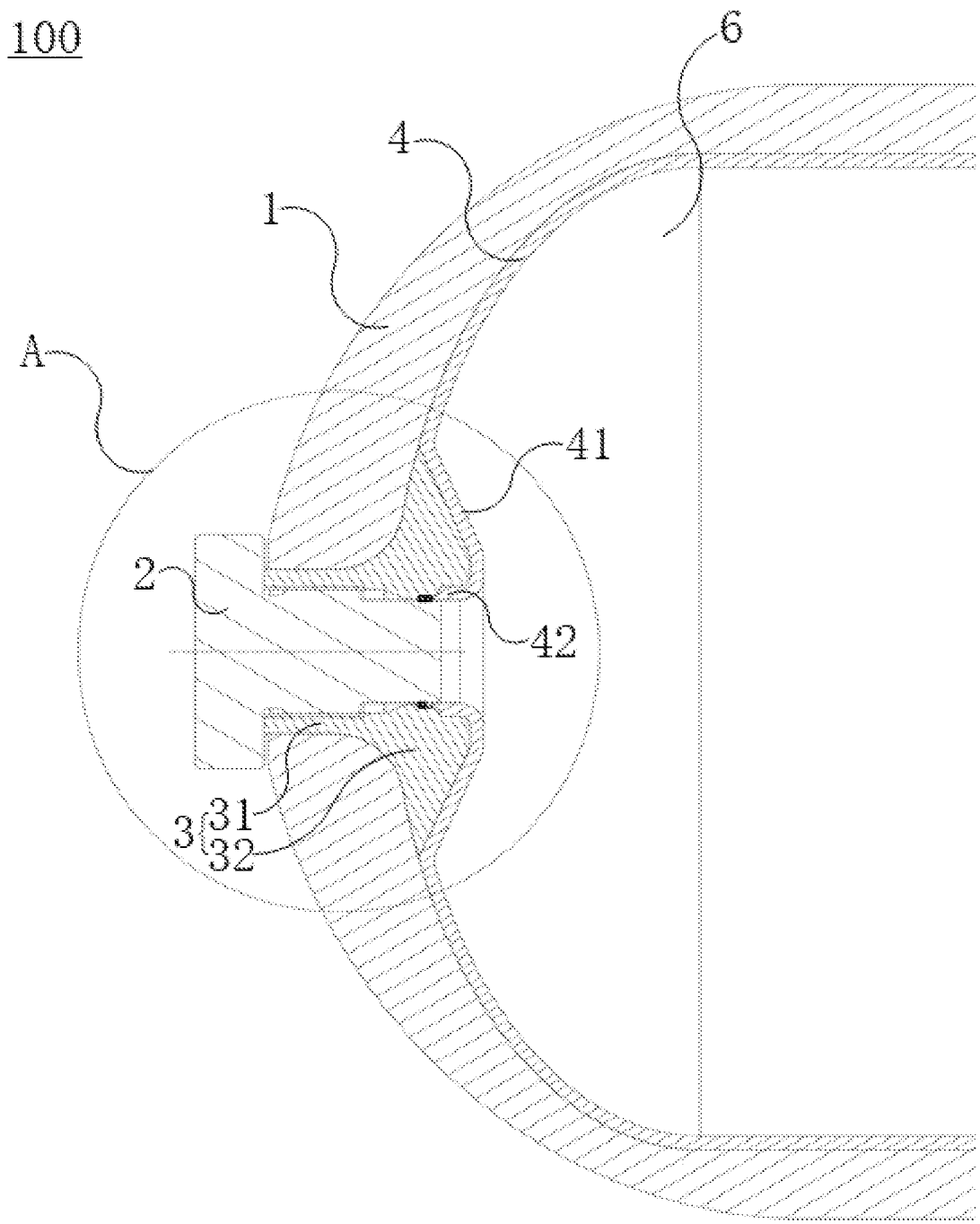
FIG. 1 is a schematic structural diagram of a pressure vessel according to a first embodiment of the disclosure.

Pressure vessel 100, casing 1, cylinder valve 2, valve seat 3, first support portion 31, second support portion 32, limiting portion 33, inner liner 4, curved portion 41, fitting portion 42, annular sealing groove 43, inner liner connecting portion 5, storage space 6, first sealing member 71, backup sealing member 72, and communication channel 8.

DESCRIPTION OF EMBODIMENTS

It should be noted that the embodiments in the present disclosure and the features of the embodiments may be combined with each other without conflicts.

The present disclosure will be described in detail below with reference to the accompanying drawings and in conjunction with the embodiments.

A pressure vessel 100 according to the embodiments of the present disclosure will be described below with reference to FIGS. 1 to 3 and in conjunction with the embodiments.

Figure 2:
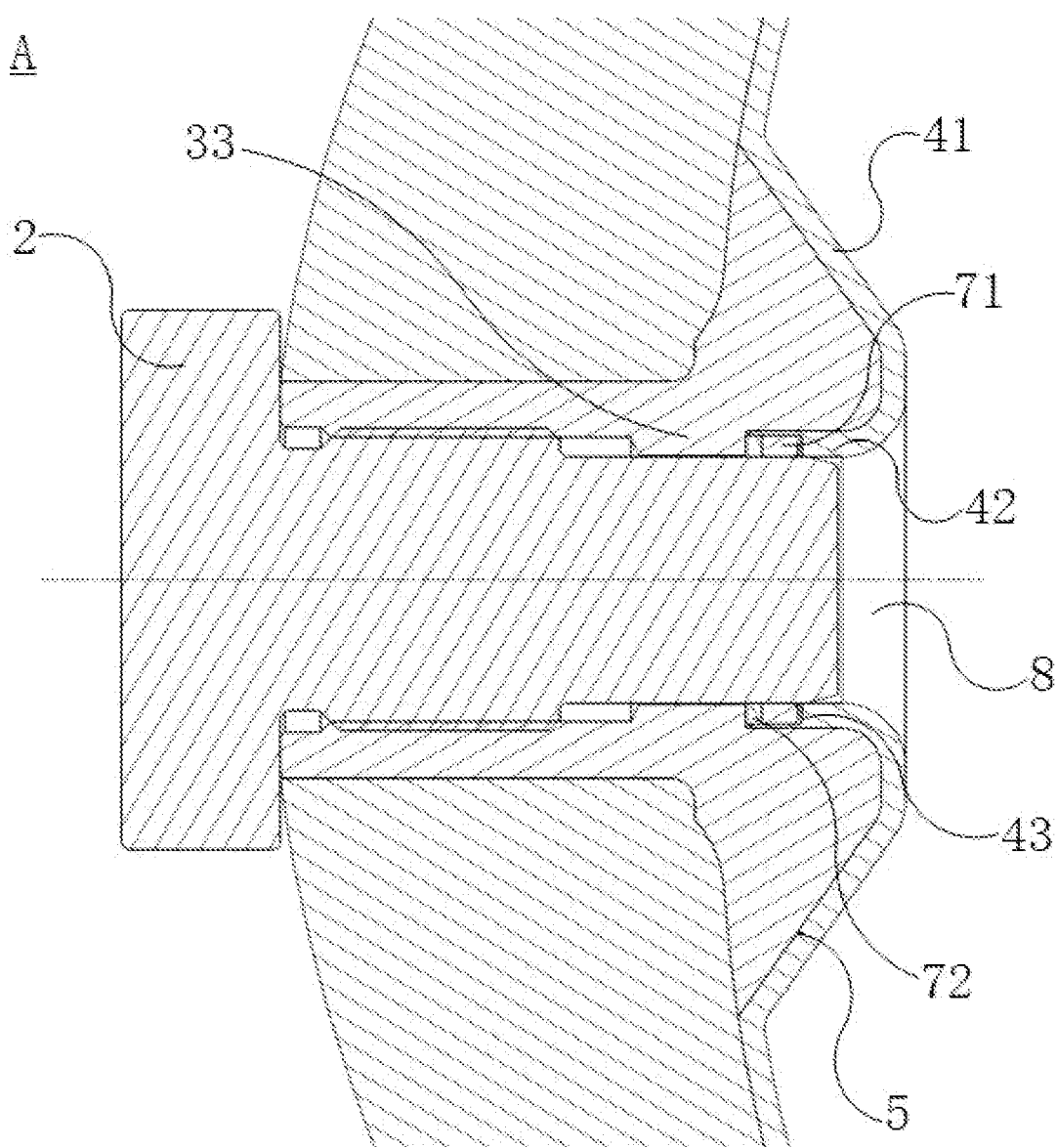
FIG. 2 is an enlarged view of position A in FIG. 1.
Figure 3:
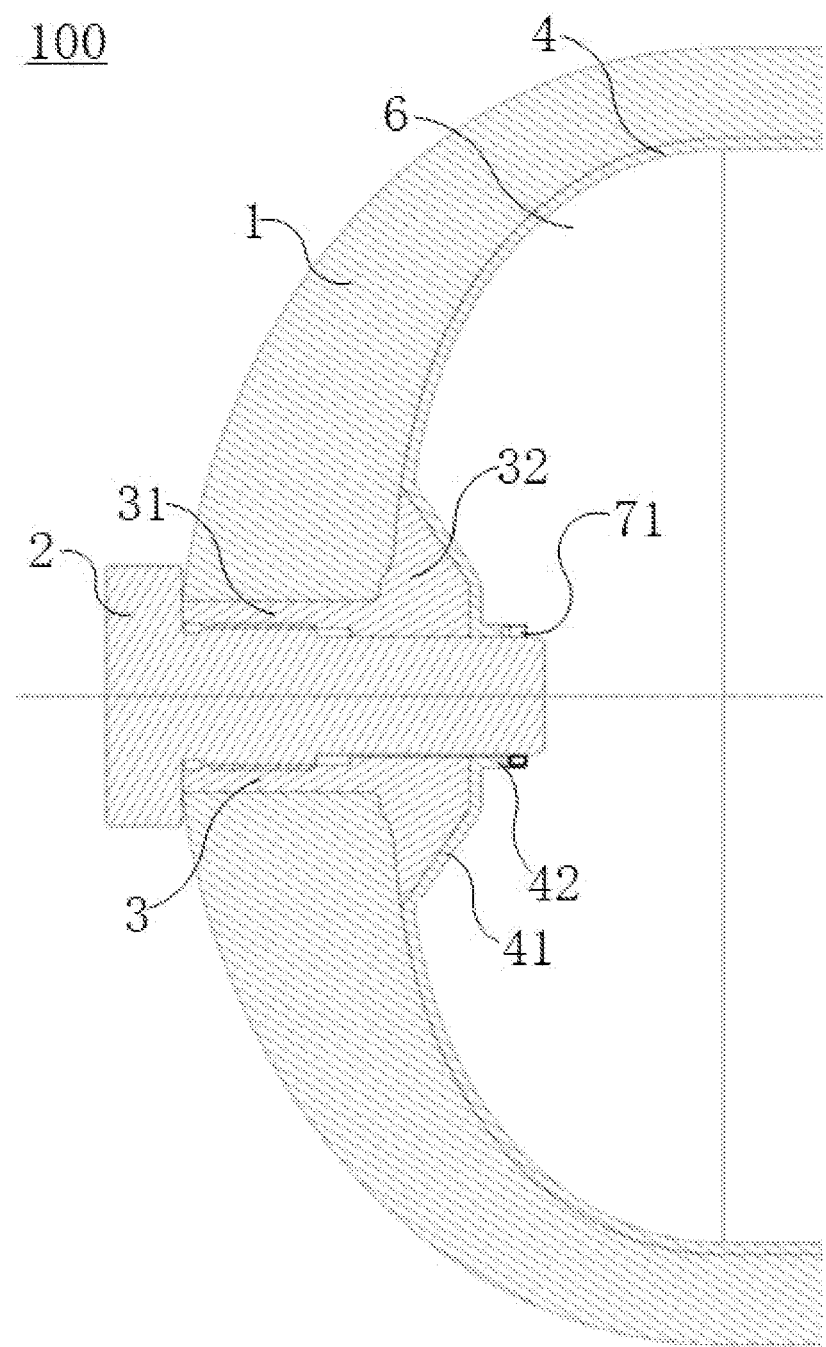
FIG. 3 is a schematic structural diagram of a pressure vessel according to a second embodiment of the disclosure.
Figure 4:
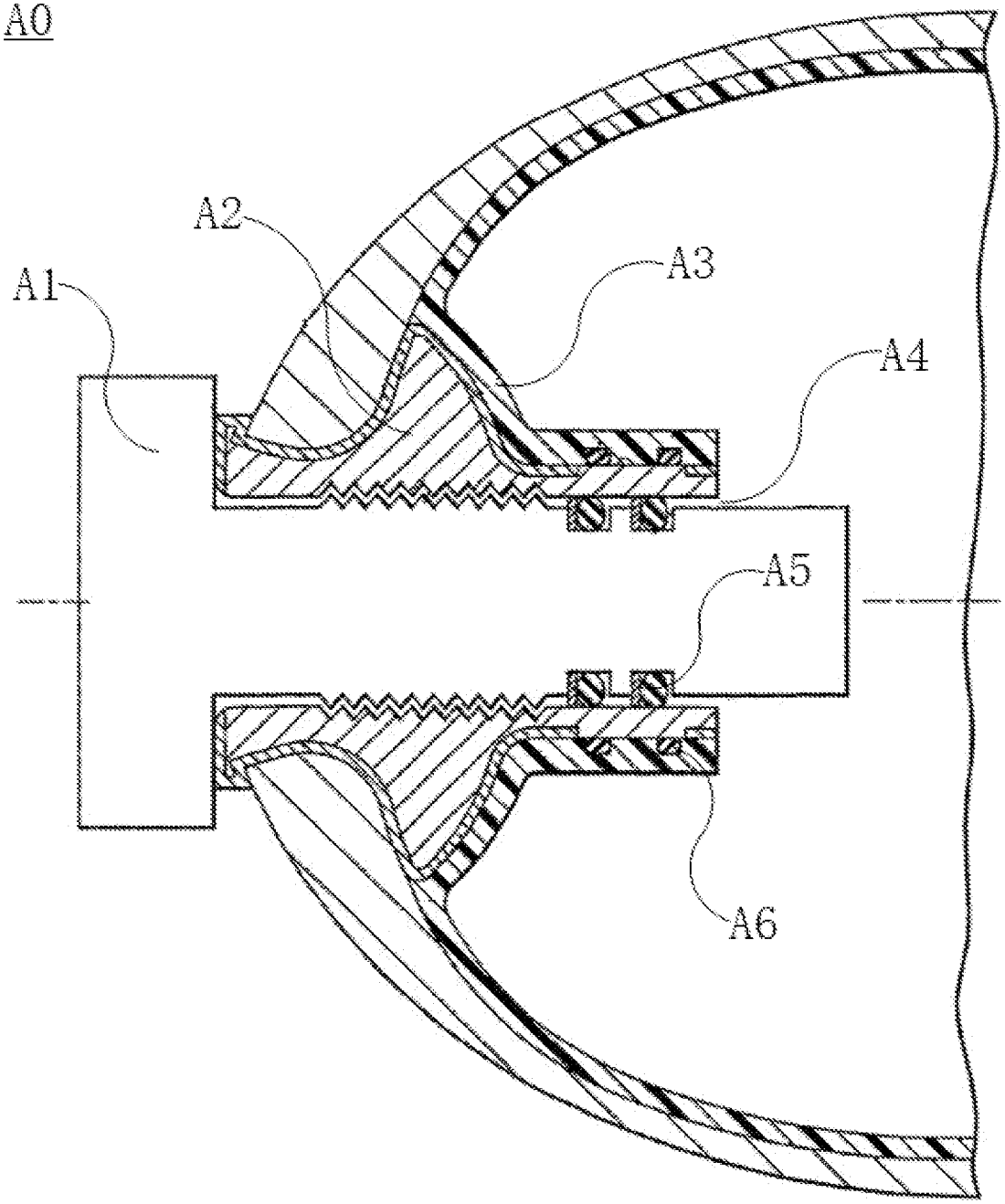
FIG. 4 is a schematic structural diagram of a pressure vessel in the related art.

As shown in FIGS. 1 to 3, the pressure vessel 100 may include a casing 1, a cylinder valve 2, a valve seat 3, and an inner liner 4. The casing 1 has a storage space 6 defined therein. The storage space 6 is configured to store fluids such as gas and liquid. The casing 1 has a communication channel 8 that communicates the storage space 6 with an outside. The cylinder valve 2 is disposed at the communication channel 8 and configured to adjust an opening degree of the communication channel 8. When the cylinder valve 2 is opened, an external fluid can enter the pressure vessel 100 through the communication channel 8 via the cylinder valve 2, or the fluid flows out of the pressure vessel 100 through the communication passage 8 via the cylinder valve 2. When the cylinder valve 2 is closed, the cylinder valve 2 prohibits fluid exchange of the fluid in the pressure vessel 100 with the outside through the communication channel 8.

As shown in FIGS. 1 to 3, the valve seat 3 is at least partially supported between the cylinder valve 2 and the communication channel 8, so as to increase the strength of the valve seat 3 at the communication channel 8, and prevent the deformation of the cylinder valve 2 under the pressure difference between the fluid pressure in the pressure vessel 100 and the external atmosphere, the pressure difference being caused by an excessively high fluid pressure in the pressure vessel 100.

As shown in FIGS. 1 to 3, the inner liner 4 is disposed on an inner wall surface of the casing 1 facing towards the storage space 6, and the inner liner 4 can further enhance the support for the valve seat 3 and the cylinder valve 2 to prevent the cylinder valve 2 from being deformed under pressure. An inner liner connecting portion 5 is formed between the inner liner 4 and the casing 1. The valve seat 3 is at least partially accommodated in the inner liner connecting portion 5. The cylinder valve 2 extends into the storage space 6 through the inner liner 4 from the inner liner connecting portion 5. The inner liner 4 further includes a fitting portion 42 adapted to surround and be attached on an outer peripheral surface of the cylinder valve 2.

By sealing between the fitting portion 42 and the inner liner 4, the valve seat 3 located in the inner liner connecting portion 5 can be separated from the storage space 6. In this way, the sealing between the cylinder valve 2 and the communication channel 8 can be ensured without provision of additional sealing measures between the valve seat 3 and the inner liner 4. Since this solution only needs sealing between the fitting portion 42 and the inner liner 4, higher sealing reliability is provided. It should be noted that, due to the sealing between the fitting portion 42 and the inner liner 4, the sealing of the storage space 6 can be ensured without sealing between the valve seat 3 and the cylinder valve 2.

Specifically, as shown in FIG. 2, a limiting portion 33 is provided on an inner wall surface of the valve seat 3. The limiting portion 33 is adapted to be attached on and stop the outer peripheral surface of the cylinder valve 2. Therefore, the limiting portion 33 can ensure the stable support of the valve seat 3 to the cylinder valve 2.

Specifically, as shown in FIGS. 1 to 3, the valve seat 3 includes: a first support portion 31 and a second support portion 32. The first support portion 31 is located in the communication channel 8 and is positioned and sandwiched between the communication channel 8 and the cylinder valve 2, to prevent the cylinder valve 2 from rotating in the communication channel 8, so that the cylinder valve 2 is installed reliably. The second support portion 32 is located in the storage space 6 and abuts against the inner wall surface of the casing 1. The first support portion 31 is connected to the second support portion 32. The second support portion 32 can increase the strength of the valve seat 3, thereby further ensuring the stabilizing effect of the valve seat 3 on the cylinder valve 2. The second support portion 32 may be located in the inner liner connecting portion 5.

In some specific embodiments, as shown in FIGS. 1 to 2, a depth of the cylinder valve 2 extending into the storage space 6 along the communication channel 8 does not exceed a depth of the valve seat 3 extending into the storage space 6 along the communication channel 8. The inner liner 4 includes a curved portion 41 that protrudes towards the storage space 6. An inner liner connecting portion 5 is formed between an inner side of the curved portion 41 and the inner wall surface of the casing 1. The curved portion 41 has a via opening through which the cylinder valve 2 extends. A circumferential edge of the via opening surrounds the fitting portion 42. The fitting portion 42 is located in the inner liner connecting portion 5. The fitting portion 42 is sandwiched between the cylinder valve 2 and the valve seat 3, so that the fitting portion 42 is fixedly attached on the cylinder valve 2 to ensure the sealing performance between the fitting portion 42 and the cylinder valve 2, and at the same time, the valve seat 3 can be sealed outside the storage space 6.

In some embodiments, as shown in FIG. 2, a free end of the fitting portion 42 extends in a direction along the cylinder valve 2 away from the storage space 6.

In some other specific embodiments, as shown in FIG. 3, the depth of the cylinder valve 2 extending into the storage space 6 along the communication channel 8 may exceed the depth of the valve seat 3 extending into the storage space 6 along the communication channel 8. The inner liner 4 has a curved portion 41 that protrudes towards the storage space 6. An inner side of the curved portion 41 forms the inner liner connecting portion 5. The curved portion 41 has a via opening through which the cylinder valve 2 extends. A circumferential edge of the via opening surrounds the fitting portion 42. The fitting portion 42 is located outside the inner liner connecting portion 5 and is attached on a portion of the cylinder valve 2 extending out of the inner liner connecting portion 5, to ensure the sealing between the fitting portion 42 and the cylinder valve 2 while sealing the valve seat 3 outside the storage space 6.

In some embodiments, as shown in FIG. 3, a free end of the fitting portion 42 extends in a direction along the cylinder valve 2 towards the storage space 6.

Specifically, as shown in FIG. 2, a free end of the fitting portion 42 may form a stepped ring so as to form an annular sealing groove 43. A first sealing member 71 for sealing the cylinder valve 2 and the fitting portion 42 is sleeved in the annular sealing groove 43. The first sealing member 71 can be a sealing ring. The first sealing member 71 is sleeved and fixed between the cylinder valve 2 and the fitting portion 42 to enhance the sealing performance between the cylinder valve 2 and the fitting portion 42.

Specifically, as shown in FIG. 2, a backup sealing member 72 for sealing the cylinder valve 2 and the fitting portion 42 is further sleeved in the annular sealing groove 43. The backup sealing member 72 can be a sealing ring. The backup sealing member 72 is sleeved and fixed between the cylinder valve 2 and the fitting portion 42. The backup sealing member 72 can be located on a side of the first sealing member 71 facing away from the storage space 6 in an axial direction of the cylinder valve 2. In this way, the backup sealing member 72 can serve as the first sealing member 71, so as to ensure better sealing performance between the cylinder valve 2 and the fitting portion 42 after the first sealing member 71 fails.

Specifically, the cylinder valve 2 is cylindrical, and the fitting portion 42 is an annular member that is attached on the cylinder valve 2. Both the curved portion 41 and the fitting portion 42 can be formed by bending the inner liner 4.

Specifically, as shown in FIGS. 1 to 3, the valve seat 3 is fixedly attached to the curved portion 41. Therefore, the curved portion 41 can fix the valve seat 3 to improve the support stability of the valve seat 3 to the cylinder valve 2.

The vehicle of the embodiments of the present disclosure is described below.

The vehicle of the embodiments of the present disclosure includes the pressure vessel according to any of the above-mentioned embodiments of the present disclosure.

According to the vehicle of the embodiments of the present disclosure, by provision of the pressure vessel, the fuel in the pressure vessel is not likely to leak, burning or explosion due to the fuel leakage of the vehicle is avoided, and the vehicle can work reliably.

The above are only preferred embodiments of the present disclosure, and are not intended to limit the present disclosure. Any modifications, equivalent replacements, improvements, etc. made within the ideas and principles of the present disclosure should be included in the protection scope of the present disclosure.

What is claimed is:

1. A pressure vessel, comprising:
   a casing having a storage space defined therein and a communication channel that communicates the storage space with an outside;
   a cylinder valve disposed at the communication channel and configured to adjust an opening degree of the communication channel;
   an inner liner disposed on an inner wall surface of the casing facing towards the storage space, wherein an inner liner connecting portion is formed between the inner liner and the casing, the cylinder valve extends out of the inner liner, the inner liner comprises a fitting portion adapted to surround and be attached on an outer peripheral surface of the cylinder valve; and
   a valve seat at least partially supported between the cylinder valve and the communication channel, wherein a limiting portion is provided on an inner wall surface of the valve seat, and the limiting portion is adapted to be attached on and stop the outer peripheral surface of the cylinder valve,
   wherein a depth of the cylinder valve extending into the storage space along the communication channel does not exceed a depth of the valve seat extending into the storage space along the communication channel, the inner liner comprises a curved portion that protrudes towards the storage space, an inner side of the curved portion forms the inner liner connecting portion, the curved portion has an opening through which the cylinder valve extends, a circumferential edge of the opening surrounds the fitting portion, the fitting portion is located in the inner liner connecting portion and is sandwiched between the cylinder valve and the valve seat, and an annular sealing groove is defined on a free end of the fitting portion, and a first sealing member for sealing the cylinder valve and the fitting portion is sleeved in the annular sealing groove; or
   wherein a depth of the cylinder valve extending into the storage space along the communication channel exceeds a depth of the valve seat extending into the storage space along the communication channel, the inner liner has a curved portion that protrudes towards the storage space, an inner side of the curved portion forms the inner liner connecting portion, the curved portion has an opening through which the cylinder valve extends, a circumferential edge of the via opening surrounds the fitting portion, the fitting portion is adapted to be attached on a portion of the cylinder valve extending out of the inner liner connecting portion, and an annular sealing groove is defined on a free end of the fitting portion and a first sealing member for sealing the cylinder valve and the fitting portion is sleeved in the annular sealing groove.

2. The pressure vessel according to claim 1, wherein the valve seat comprises:
   a first support portion located in the communication channel and positioned and sandwiched between the communication channel and the cylinder valve; and a second support portion connected to the first support portion, located in the storage space and in the inner liner connecting portion, and abutting against the inner wall surface of the casing.

3. The pressure vessel according to claim 1, wherein a free end of the fitting portion extends in a direction along the cylinder valve away from the storage space.

4. The pressure vessel according to claim 1, wherein a free end of the fitting portion extends in a direction along the cylinder valve towards the storage space.

5. The pressure vessel according to claim 1, wherein a backup sealing member for sealing the cylinder valve and the fitting portion is further sleeved in the annular sealing groove.

6. The pressure vessel according to claim 1, wherein the valve seat is fixedly attached on the curved portion.

7. A vehicle, comprising the pressure vessel according to claim 1.

8. The vehicle according to claim 7, wherein the valve seat comprises:

a first support portion located in the communication channel and positioned and sandwiched between the communication channel and the cylinder valve; and a second support portion connected to the first support portion, located in the storage space and in the inner liner connecting portion, and abutting against the inner wall surface of the casing.

9. The vehicle according to claim 7, wherein a free end of the fitting portion extends in a direction along the cylinder valve away from the storage space.

10. The vehicle according to claim 7, wherein a free end of the fitting portion extends in a direction along the cylinder valve towards the storage space.

* * * * *